(12) United States Patent
Stachel

(10) Patent No.: US 9,904,899 B2
(45) Date of Patent: Feb. 27, 2018

(54) SYSTEMS AND/OR METHODS FOR REACTIVE, DISTRIBUTABLE, AND EXTENSIBLE PROCESS EXECUTION

(71) Applicant: Software AG, Darmstadt (DE)

(72) Inventor: Michael Stachel, Wadern (DE)

(73) Assignee: SOFTWARE AG, Darmstadt (DE)

( * ) Notice: Subject to any disclaimer, the term of this patent is extended or adjusted under 35 U.S.C. 154(b) by 27 days.

(21) Appl. No.: 14/470,296

(22) Filed: Aug. 27, 2014

(65) Prior Publication Data

US 2016/0063401 A1 Mar. 3, 2016

(51) Int. Cl.
*G06F 9/44* (2006.01)
*G06Q 10/06* (2012.01)

(52) U.S. Cl.
CPC .................. *G06Q 10/067* (2013.01)

(58) Field of Classification Search
CPC .................................... G06Q 10/067
USPC ........................................ 717/100
See application file for complete search history.

(56) References Cited

U.S. PATENT DOCUMENTS

| | | | |
|---|---|---|---|
| 5,329,619 | A | 7/1994 | Pagé et al. |
| 5,812,768 | A | 9/1998 | Pagé et al. |
| 8,136,122 | B2 | 3/2012 | Holar et al. |
| 8,301,687 | B2 | 10/2012 | Rokicki et al. |
| 8,453,163 | B2 | 5/2013 | Kothamasu et al. |
| 2003/0236690 | A1* | 12/2003 | Johnston-Watt ...... G06F 9/5066 717/141 |
| 2009/0089625 | A1* | 4/2009 | Kannappan ............ G06Q 10/10 714/39 |
| 2010/0030734 | A1* | 2/2010 | Chunilal ........... G06F 17/30867 707/770 |
| 2010/0082856 | A1* | 4/2010 | Kimoto ................... H04L 47/10 710/45 |

(Continued)

OTHER PUBLICATIONS

Oracle—A Hands on Introduction to BPEL, Part 2: Advanced BPEL, by Matjaz B. Juric, retrieved Aug. 27, 2014, pp. 1-12. http://www.oracle.com/technetwork/articles/matjaz-bpel2-082861.html.

(Continued)

*Primary Examiner* — Li B Zhen
*Assistant Examiner* — Sen Chen
(74) *Attorney, Agent, or Firm* — Nixon & Vanderhye P.C.

(57) ABSTRACT

Certain example embodiments relate to techniques for executing business processes in a distributed computer system (e.g., cloud-based) environment. A representation of the business process is decomposed into executable components. The executable components each have assigned thereto process and sequence identifiers, and each is classified as having an executable component types. The executable component types including integration, task, and data flow types. The integration flow type represents activities to be performed in connection with external computer systems, the task flow type represents human-interactive activities, and the data flow type represents activities to be performed on data relevant to the business process. The executable components are deployed to nodes in the distributed computing environment such that the executable components are performed in sequence identifier order using processing resources of the respective nodes to which they are deployed, except executable components with the same sequence identifiers are performed in parallel on different nodes.

23 Claims, 11 Drawing Sheets

(56) References Cited

U.S. PATENT DOCUMENTS

| | | | | |
|---|---|---|---|---|
| 2010/0161362 | A1* | 6/2010 | Shapira | G06Q 10/00 705/7.11 |
| 2010/0211815 | A1* | 8/2010 | Mankovskii | G06F 11/0709 714/2 |
| 2011/0218924 | A1* | 9/2011 | Addala | G06Q 10/103 705/301 |
| 2012/0078802 | A1* | 3/2012 | Kieselbach | G06Q 10/06 705/319 |
| 2012/0124584 | A1* | 5/2012 | Addala | G06F 9/542 718/102 |
| 2013/0262267 | A1* | 10/2013 | Taylor | G06Q 30/0613 705/26.41 |
| 2014/0156717 | A1* | 6/2014 | Krishna | G06F 17/30082 707/830 |
| 2014/0223408 | A1* | 8/2014 | Wunderlich, Jr. | G06F 9/4446 717/101 |
| 2014/0278724 | A1* | 9/2014 | Compagna | G06Q 10/0633 705/7.27 |
| 2015/0019298 | A1* | 1/2015 | Curbera | G06Q 10/06375 705/7.37 |
| 2015/0039379 | A1* | 2/2015 | Brown | G06Q 10/06316 705/7.26 |
| 2015/0235154 | A1* | 8/2015 | Utschig | G06Q 10/067 705/7.36 |

OTHER PUBLICATIONS

Java EE7—Introduction to Batch (JSR 352), by Chris Vignola, Jun. 18, 2013, pp. 1-7. http://jaxenter.com/java-ee-7-introduction-to-batch-jsr-352-47400.html.

RabbitMQ with CDI Integration, by Christian Bick, Sep. 10, 2012 (with machine-generated translation), pp. 1-4. http://jaxenter.de/artikel/RabbitMQ-mit-CDI-integrieren.

Diploma Thesis—5.4 Actor-Based Concurrency, retrieved Aug. 27, 2014, pp. 1-7. http://berb.github.io/diploma-thesis/original/054_actors.html.

Remote Actors—Discovering AKKA, Nov. 2012, pp. 1-4. http://www.nurkiewicz.com/2012/11/remote-actors-discovering-akka.html#!/2012/11/remote-actors-discovering-akka.html.

Oracle—The JMS API Programming Model—The Java EE 5 Tutorial, retrieved Aug. 27, 2014, pp. 1-8. http://docs.oracle.com/javaee/5/tutorial/doc/bnceh.html.

Technology Park—AKKA-Really Mountains of Concurrency, Sep. 28, 2012, pp. 1-7. http://prabhubuzz.wordpress.com/2012/09/28/akka-really-mountains-of-concurrency/.

AKKA—Actor References, Paths and Addresses, retrieved Aug. 27, 2014, pp. 1-5. http://doc.akka.io/docs/akka/2.1.0/general/addressing.html.

Wikipedia—Observer Pattern, retrieved Aug. 27, 2014, pp. 1-7. http://en.wikipedia.org/wiki/Observer_pattern.

Wikipedia—Staged Event-Driven Architecture, retrieved Aug. 27, 2014, pp. 1-2. http://en.wikipedia.org/wiki/Staged_event-driven_architecture.

Spring Batch Introduction, retrieved Aug. 27, 2014, pp. 1-11. http://docs.spring.io/spring-batch/trunk/reference/html/spring-batch-intro.html.

The Reactive Manifesto, published Sep. 23, 2013, pp. 1-11. http://www.reactivemanifesto.org/.

Tammo van Lessen et al., Automate Business Processes with BPEL, Chapter 5: Business Process Execution Language (BPEL), copyright 2011, 338 pages (with machine translation).

* cited by examiner

SYSTEMS AND/OR METHODS FOR REACTIVE, DISTRIBUTABLE, AND EXTENSIBLE PROCESS EXECUTION

TECHNICAL FIELD

Certain example embodiments described herein relate to techniques that improve process execution, e.g., in cloud-based and/or other distributed computing environments. More particularly, certain example embodiments described herein relate to techniques for enabling reactive, distributable, and extensible process execution, that enable a process to be broken down into different executable components that can be performed in parallel.

BACKGROUND AND SUMMARY OF EXAMPLE EMBODIMENTS

A business process is a series of enterprise tasks, often undertaken for the purpose of creating valuable output for an internal or external customer. For instance, a business process may give organizational actions structure across time, place, and functions. Business processes have become a chosen means to describe, analyze, execute, and control operational structures across departments, business units, and even business partners.

Business process management (BPM) aims to improve business processes, e.g., for the sake of overall business success. Among others, software-enabled business process automation is an instrument to increase process efficiencies and effectiveness. Business process models have been established to specify processes throughout BPM projects. For automation purposes, for example, they can help document and structure process information prior to their transformation into executable (e.g., code-based) specifications.

Business process models help describe the logical and timely flow of business processes as a map. They may help visualize process activities as graphical symbols, possibly connecting them to a linear or other order. Logical operators may indicate when the flow splits into alternative or parallel paths, when they merge again into one, etc. This so-called control flow is a part of a business process model. The control flow may be complemented by additional model elements that differ depending on the perspective. A conceptual-organizational perspective targets the organizational process context including, for example, intra- and inter-organizational division of labor, interaction between human activities, their technical support, product outcome, etc.

The event-driven process chain (EPC) modeling language has emerged as one standard for such conceptual business processes. It complements process activities by identifying organizational resources responsible, input required, and output produced, supporting software application systems, organizational objectives, risks, etc. Business process modeling further changes the perspective from a more organizational design perspective into a more technical engineering perspective, e.g., at the transformation from conceptual into technical business process models.

In this regard, model-driven process automation passes the control flow described in a conceptual business process model on to a technical business process model. Here, it is complemented by technical information such as, for example, process variables for storing process information during execution, online forms for user interaction, exceptions and their handling, communication patterns (asynchronous/synchronous), consistent data exchange, etc. To make a process executable, process activities typically are assigned to automated software functionality or to semi-automated user interfaces. Depending on the chosen modeling language and the targeted deployment system, this transformation may result in a second graphical diagram (e.g., in BPMN 2.0), directly into a code-based script (e.g., BPEL, XPDL, or the like), etc.

The resulting technical process models are to be deployed into the process engine of a business process management system (BPMS) or workflow management system (WFMS), which allows for starting, executing and tracking instances of this process efficiently.

Service-oriented architectures (SOA) have attempted to meet integration challenges related to business process automation by exposing and integrating remote software functionality through well-defined software service interfaces. Early proponents conceived of SOA instead as a specific style of distributed software architectures based on the so-called find-bind-execute relationship between service providers and consumers. More recent notions advance this integration view towards the potential SOA offers for business process automation. They put process automation into the center of the SOA discussion. The capability to compose services loosely opens new avenues to implementing business processes flexibly following dynamic business requirements. The adoption of standardized service interfaces allows for the reusing of services in different business processes, as well as flexibly replacing services according to evolving business requirements. In this sense, SOA has been considered a paradigm for organizing and utilizing distributed capabilities that may be under the control of different ownership domains.

Web services represent one of the most recent incarnations of service-oriented software technologies. While the SOA approach reinforces well-established, general software architecture principles of interface-orientation, interoperability, autonomy, and modularity, it also adds additional themes of process-orientation. Thus, service-oriented design seeks to improve business process flexibility by the separation of process structure (e.g., process flow) and process institutionalization (e.g., selection of service capabilities conducting process activities), and business process systems can benefit from service-orientation.

As indicated above, one paradigm for executing modeled business processes involves defining them in BPEL (Business Process Execution Language), then deploying them, and lastly executing them in BPEL-engines. FIG. 1 is a block diagram showing a reference architecture for a BPEL engine 102. Processes can be modeled using the business process modeling tool 104, and the defined models may be persisted in the model store 106.

As shown in FIG. 1, the deployed process 108 is loaded as a whole and executed, alongside the nodes in a tree structure representation of the process that may be viewed using a navigator tool 110 or the like. This implies that when a new process starts executing, the process is loaded, and an initial process token is generated and given the root node of the process tree. The token in this sense is responsible for executing the functions defined in the different nodes, e.g., using the environment provided by the BPEL engine 102. For instance, the BPEL engine 102 is provided with a connection to an enterprise service bus (ESB) 112 and internal and/or external web service components 114. The web service components 114 provide processing resources, instance routing, message correlating, and/or other functions, and these and/or other activities may be coordinated over the ESB 112.

If a single node finishes executing, the token navigates to next node until the execution of the whole process is finished. Each token may be backed by an execution thread such that, within a thread pool of a given size, there could be more than one process executing at a time. This execution model is similar to the servlet execution model, where each incoming request is bound to an execution thread that then works on the respective request until a response is sent back. Although not shown in FIG. 1, the BPEL engine 102 may be backed by processing resources such as, for example, at least one processor, memory, non-transitory computer readable storage media, and/or the like.

During process execution, runtime and/or audit data may be maintained in respective stores 116 and 118. The data stored in the runtime and/or audit data stores 116 and 118 may be viewed, analyzed, etc., using a business activity monitoring tool 120 and/or a business process analyzing tool 122.

One factor making business process automation a real technical challenge is the plethora of heterogeneous and increasingly distributed software systems to be integrated and connected along a given process flow. BPEL engines of the type described above help execute business processes with a proven model, even in such environments. Yet there are still shortcomings with existing solutions, and it would be desirable to further improve upon them—especially as cloud-based architectures become more prevalent and more complex, and as business processes also become more processing resource intensive and complex in their own rights.

Unfortunately, because of the state-fullness of the process token, there is no (or only extremely limited) possibility to shrink the least executable unit in existing solutions. As a result, a process is executed as a whole inside one environment in one node. In a somewhat related regard, as the model described above is based on threads, implementations become blocked on input/output (I/O) bounded functions (e.g., integration and task flow functions as described below). Blocking based on I/O bounded functions can, in turn, decrease throughput, lower the number of flows executable in parallel, etc. Resource utilization can be correspondingly inefficient, and higher demands may be placed on the associated runtime environment(s), thereby also contradicting at least the theoretical benefits cloud-based computing paradigms.

Another category of drawbacks relates to difficulties in implementing and/or maintaining a recovery mechanism (e.g., in case of failure, timeout, and/or the like). Difficulties arise, for example, because the whole context of the token and the exact position in the tree may need to be stored. Difficulties also can arise because there is a need to navigate to the position where the failure, timeout, or other event occurred, and it would be desirable (although not necessarily possible) to do so without also re-executing the activities performed by the already visited nodes. Central resilience policies such as, for example, retry options, rerouting, temporal blacklisting, etc., also can be difficult to implement, e.g., because processes are not necessarily uniform with respect to one another in terms of size, number of branches, amount of I/O bounded functions (and associated processing latencies imposed), etc.

Thus, it will be appreciated that it would be desirable to overcome the above-described and/or other challenges. For instance, it would be appreciated that it would be desirable to enable the execution of processes in a cloud-based environment.

Certain example embodiments relate to techniques that enable modeled business processes (e.g., processes defined in BPEL or the like) to be divided into multiple parts, with those parts being executable in different cloud instances. In contrast with current techniques that involve executing modeled business processes as a whole, certain example embodiments improve scalability, e.g., by enabling processing resources to be dynamically deployed at runtime (e.g., instead of or in addition to being predefined at design time or the like), resilience, responsiveness, etc.

One aspect of certain example embodiments relates to an approach in which the major components of a business process are identified (e.g., as being one of integration, task, and data flow types) and divided into multiple independent units. Each independent unit is executable by a separate processing environment (e.g., in a cloud-based or other distributed computing environment) in certain example embodiments.

Another aspect of certain example embodiments relates to the control of an overall business process flow, including divided bundles of executable logic executed by disparate systems in a cloud-based or other environment, in connection with events processed by a flow dispatcher and a flow inspector.

Another aspect of certain example embodiments relates to using flow supervisors and/or recoverers, e.g., which help provide resilience to the overall process execution.

Still another aspect of certain example embodiments relates to receiving a large BPEL or other executable process definition, breaking it down into executable parts, and executing those parts in parallel for performance purposes. The execution is performed on a comparatively high level (e.g., above the thread level), and the parallelization occurs with respect to bundles of executable logic, in certain example embodiments.

In certain example embodiments, a method of executing a business process in a distributed computing environment. Using at least one processor, a representation of the business process is decomposed into a plurality of executable components. The executable components each have assigned thereto process and sequence identifiers, and each is classified as being one of a plurality of different executable component types is provided. The different executable component types including integration, task, and data flow types. The integration flow type represents activities to be performed in connection with external computer systems, the task flow type represents human-interactive activities, and the data flow type represents activities to be performed on data relevant to the business process. The executable components are deployed to nodes in the distributed computing environment such that the executable components are performed in sequence identifier order using processing resources including processors of the nodes to which the executable components are respectively deployed, except that executable components with the same sequence identifiers are performed in parallel on different nodes, in executing the business process.

In certain example embodiments, a method of executing a process in a distributed computing environment is provided. Using at least one processor, a representation of the process us decomposed into a plurality of executable components, with the executable components each having assigned thereto process and sequence identifiers. The executable components are sent to computer nodes in the distributed computing environment for execution thereon, with each said executable component being sent as an associated event over an event bus. Each computer node that receives an event is controlled to at least: determine, based on the received event and the metadata of the associated executable component, an executable component type of the respective executable component, the executable component type being one of an integration, task, and data flow type, the integration flow type representing activities to be performed in connection with external computer systems, the task flow type representing human-interactive activities, and the data flow type representing activities to be performed on data relevant to the process; spawn an execution environment tailored to the executable component type of the executable component associated with the received event; execute the executable component associated with the received event using the spawned execution environment and processing resources provided to the respective node, the processing resources including at least one processor; determine whether there is a next step in the process to be executed; and in response to a determination that there is a next step in the process to be executed, sending a new event corresponding to the next step to the event bus, along with associated metadata.

In certain example embodiments, a distributed computing system in which a process is to be executed is provided. The system includes a plurality of computer nodes, each said node including processing resources comprising at least one processor and a memory; and an event bus. A first node is designated as a supervisor node. The supervisor node is configured to at least: decompose into a plurality of executable components, using its processing resources, an executable representation of the process, the executable components each having assigned thereto process and sequence identifiers; and send the executable components to other computer nodes in the distributed computing environment for execution thereon, each said executable component being sent as an associated event over the event bus. Each node that receives an event having an associated executable component is controlled to at least: determine, based on the received event and the metadata of the associated executable component, an executable component type of the respective executable component, the executable component type being one of an integration, task, and data flow type, the integration flow type representing activities to be performed in connection with external computer systems, the task flow type representing human-interactive activities, and the data flow type representing activities to be performed on data relevant to the process; spawn thereon an execution environment tailored to the executable component type of the executable component associated with the received event; execute the executable component associated with the received event using the spawned execution environment and the processing resources provided to the respective node; determine whether there is a next step in the process to be executed; and in response to a determination that there is a next step in the process to be executed, sending a new event corresponding to the next step to the event bus, along with associated metadata.

Non-transitory computer readable storage mediums tangibly storing instructions for performing the above-summarized and/or other approaches also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS

Figure 1:
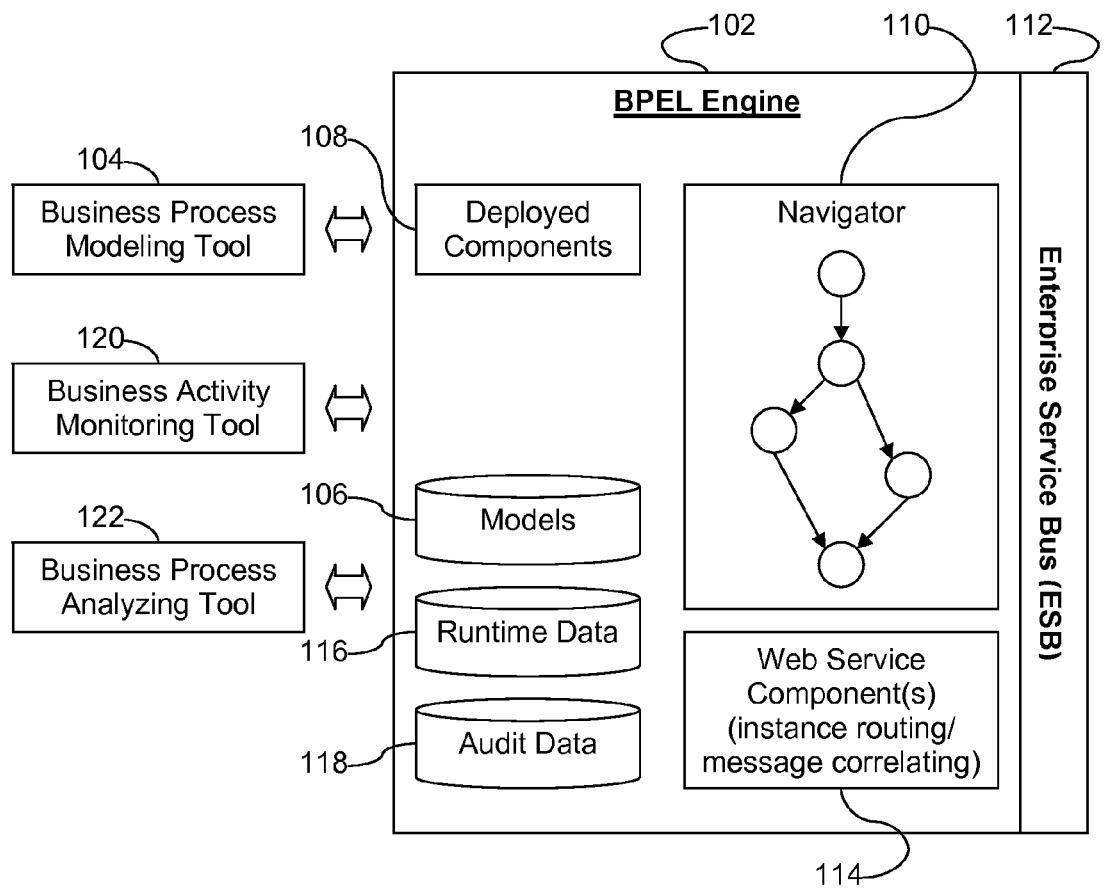
FIG. 1 is a block diagram showing a reference architecture for a BPEL engine.

The inventor has recognized that executable modeled processes basically are built from process and data flow definitions, and that the process flow in essence defines the sequencing, possible parallelisms, and types, for the individual steps. The inventor has further recognized that these types can be further classified as belonging to one of three distinct types of process flows details, which represent the common ingredients for executable processes. These distinct types of process flows details include:

Integration flows: Integration flow type tasks help identify activities performed in connection with other systems. In certain example implementations, they may be built on Java enterprise outbound connectors, enterprise integration pattern realizations like Apache Camel and Spring Integration, and/or the like. Typical tasks in modeled processes falling into this type may include, for example, notification functions like emailing, automated functions like web service interactions with third-party applications, etc. Tasks of this flow type normally may be timeout controlled, e.g., so that the whole system remains responsive (e.g., not blocked forever or for some prolonged period of time), even in case of failure. Further improvements may include retry mechanisms, temporal blacklisting of non-responsive applications, etc. Tasks falling into this flow type typically are I/O implicated (e.g., I/O bound) functions.

Task flows: Task flow type tasks help in generating tasks for human interactions with the process. After creating a human task in the task repository, there normally is also a corresponding supervising function registered, and a supervising function may be scheduled to run if (for example) the due date for handling the human task is overdue. Tasks falling into this type also typically are I/O implicated (e.g., I/O bound) functions.

Data flows: Data flow type tasks help handle data calculations, analysis, and/or other data-related operations within the process. Data flow type tasks may in some scenarios be performed in a parallel manner, e.g., provided that they are independent from one other. The grade of the parallelism achievable may be dependent upon the branching definitions inside the process (whereas the computing instructions may be defined inside an accompanying data flow). These tasks may be mainly CPU bound.

Certain example embodiments advantageously incorporate some or all of the following and/or other features to make process executions cloud enabled:

Event driven: At least some of the individual steps in the execution of the processes are not related to one another and instead are loosely coupled, with different events being transmittable to trigger step executions.

Scalable: Besides being event driven, the execution of the individual steps is stateless, which enables program logic to be distributed and helps provide the groundwork for horizontal scalability.

Resilient: Being event driven helps ensure that a given step will be re-executed if a new trigger event is sent, e.g., in case of failure, timeout, or the like. Additional supervisor actions control the execution and decide on such re-execution, other failure recovery measures to take, and/or the like. Even complete hardware failures or take downs may be recoverable from, e.g., because the re-execution of steps may in some instances run on other still- or newly-available machines, e.g., because of potential horizontal scalability. Thus, supervising the execution steps with the possibility of taking appropriate action makes the system more resilient and robust, thereby also possibly reducing maintenance costs and providing with higher service-level agreement (SLA) compliance.

Responsive: Execution steps use hardware resources if the step is really doing work, which at least implies that the execution does not block resources (such as, for example, threads and memory) while it is waiting for an I/O task or a remote call to happen. This non-blocking behavior may provide higher throughput and better resource utilization, while also allowing for commodity hardware with possibly lower capacities to be used, e.g., in cloud environments.

It thus will be appreciated that certain example embodiments enable the execution of processes in environments such as, for example, cloud-based environments that include commodity hardware resources and that are elastically (e.g., horizontally) scalable. Certain example embodiments further are event driven, stateless, resilient, and non-blocking, which helps further these and/or other ends.

A brief description of how certain example embodiments operate will now be provided. Decomposing an executable modeled process into its distinctive types of flows (e.g., of the types described above) provides a list of least-executable units ordered in accordance with their sequence defined in the process. In certain example embodiments, the same sequence numbers indicate that different units could be executed in parallel. Sequence numbers are produced and stored by the execution engine while parsing a process definition deployed for execution. The sequencing section below provides a simplified illustration of this procedure.

Because every unit is technically independent of each other in certain example embodiments, there is no need to execute each unit in the same context and environment, and the correct sequencing can be preserved. Moreover, units of different processes may run in the same environment, as well. In certain example embodiments, aside from an indication of the process identifier and the appropriate sequence number of the executed units, there is no state information that needs to be maintained.

Moreover, because the process identifier and unit sequence number are the only state information needed in certain example embodiments, such information may be wrapped in an event. Such an event may include the appropriate (e.g., next) sequence number and process identifier as attributes, and events with this information may be distributed to different nodes within the same environment using an existing eventing mechanism. In certain example embodiments, every node may be a sender as well as a potential receiver of these kinds of events, e.g., so that even in a single node scenario, the further execution of units may proceed because the node would receive its own send events.

A variety of information about the overall environment may be persisted. Such information may include, for example, the processing resources and/or abilities of each node, the runtime components needed to execute the different kinds of flows, the sending and receiving event possibilities, etc. This repository may be a shared resource to which all nodes are connected in certain example embodiments.

Certain example embodiments thus provide a new execution model that address challenges associated with providing a responsive, scalable, and resilient solution that copes with high resource utilization and that is built on a reactive foundation. Further details of these operations will now be provided.

Smaller Chunks

In certain example embodiments, the whole process is divided into smaller chunks, e.g., during deployment of the process into the execution module. A chunk is this sense may be thought of as being a component with the same application programming interface (API) but with different implementations that include more than one class and that are coherent with respect to each other. With chunk components, the execution engine is able to execute different kinds of process steps in a homogeneous way. Furthermore, a chunk component serves as an executable piece of code that represents a transactional unit. As a result, a chunk component may be executed successfully, or retried (e.g., in its entirety) until it is finished.

Figure 2:
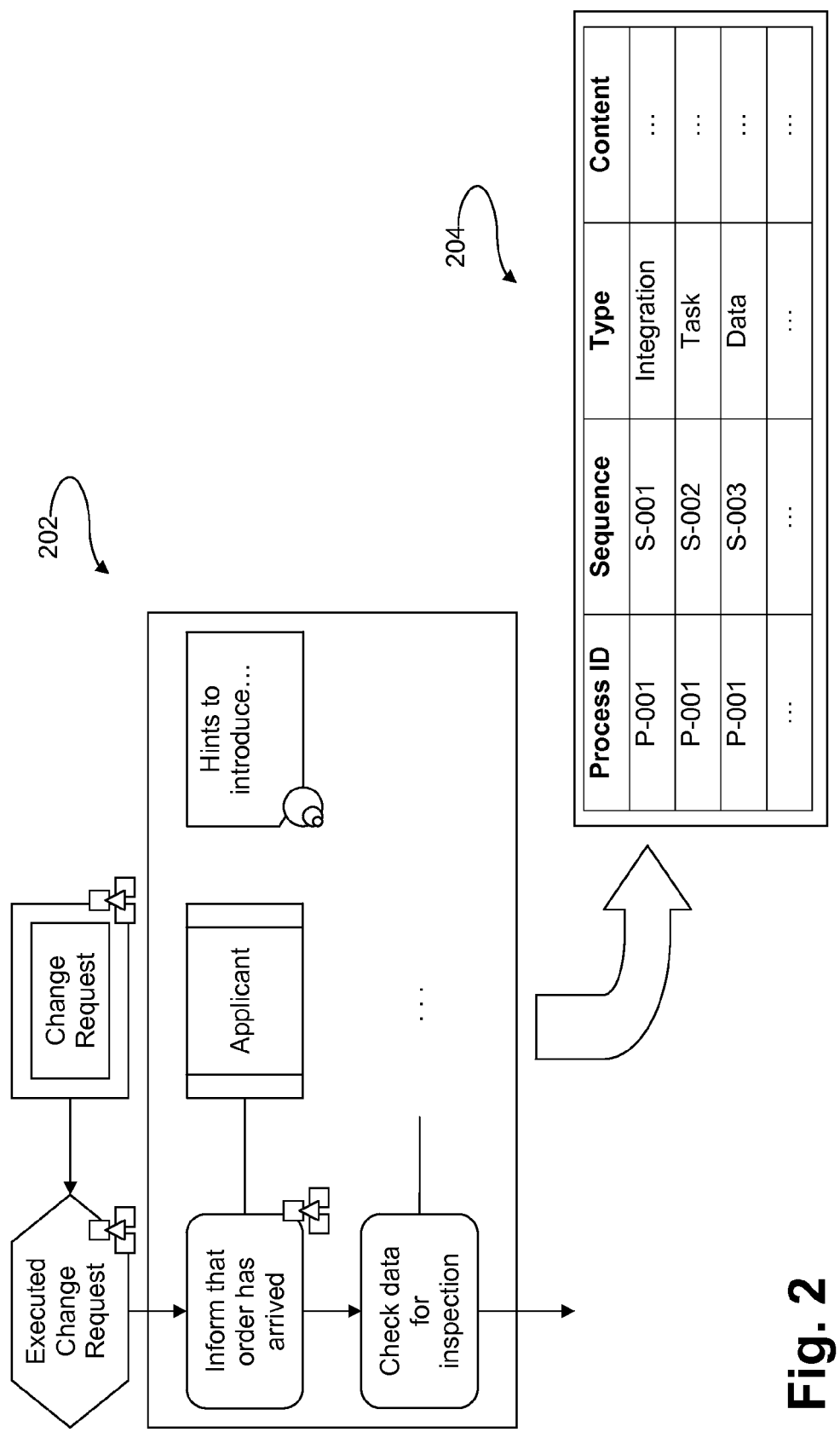
FIG. 2 is a block diagram showing an example process being broken down into chunks represented in a tabular structure, in accordance with certain example embodiments.

FIG. 2 is a block diagram showing an example process 202 being broken down into chunks represented in a tabular structure 204, in accordance with certain example embodiments. Each row in the tabular structure 204 represents a chunk and, as will be appreciated from FIG. 2, each chunk has associated metadata. The metadata in this example includes a process identifier, sequence number, and type (e.g., developed in accordance with the stereotyping features of certain example embodiments, discussed in greater detail below. This information may be treated as the process definition and may be stored in a common repository. As will be appreciated, these chunks provide the basic building blocks for execution of the overall process. Individually, they are independent of each other, under the condition that the correct sequencing is preserved.

Stereotyping

Figure 3:
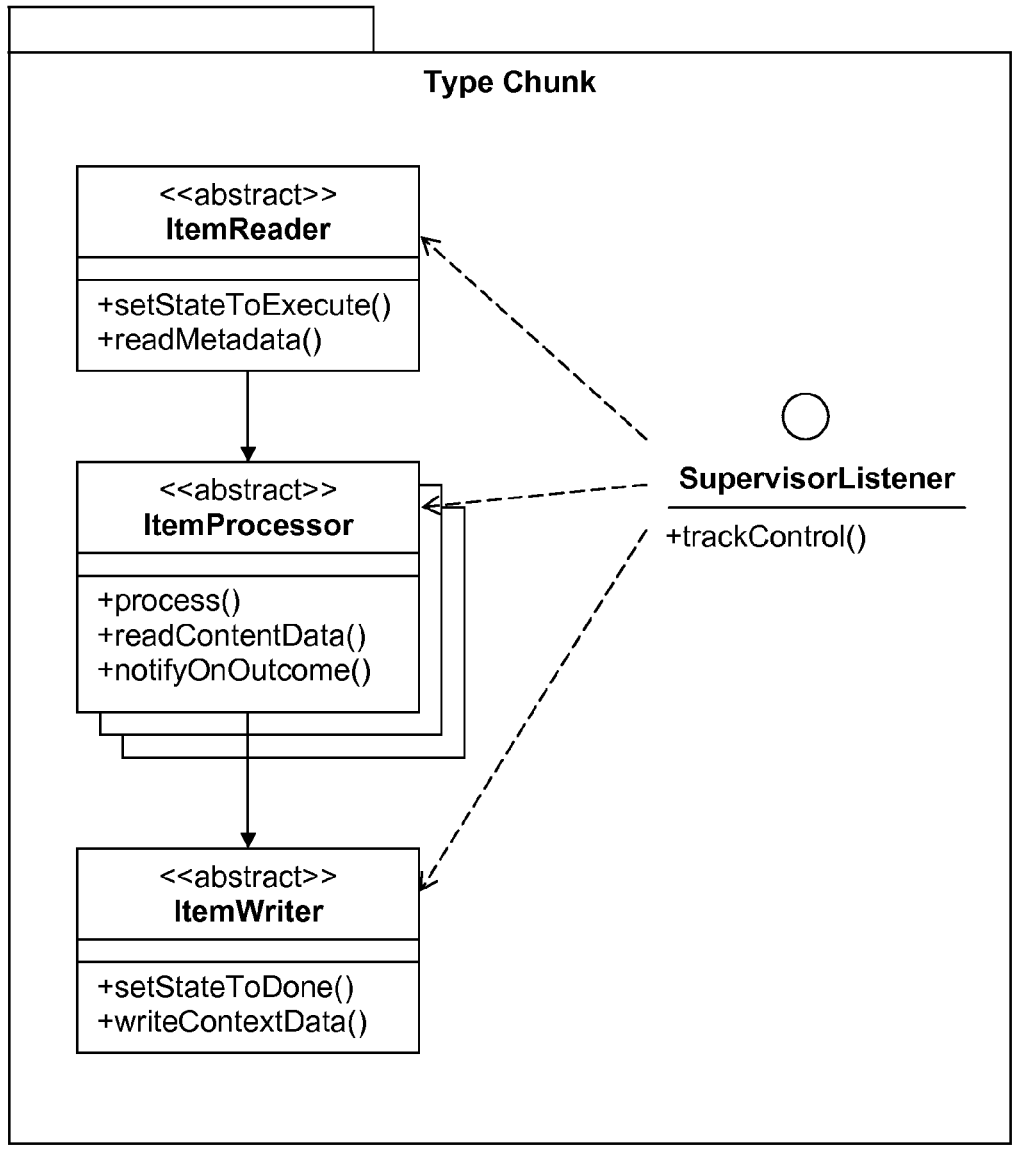
FIG. 3 schematically represents a basic operational flow and abstract classes of a common template for the integration, task, and data flow chunk types, in accordance with certain example embodiments.

Stereotyping may be thought of as a process of classifying single chunks of a whole process with certain characteristics to a common notion with common execution handling. As indicated above, certain example embodiments involve three distinct flow types, namely, integration, task, and data flow types. Drilling down further, there also is a common base for these three types that may be presented with an application of the abstract template pattern. FIG. 3 schematically represents a basic operational flow and abstract classes of a common template for the integration, task, and data flow chunk types, in accordance with certain example embodiments. As will be appreciated from FIG. 3, these three chunk types each involve items being read, processed, and written, e.g., under the control of a supervisor/listener object. Example functions of the classes also are shown in FIG. 3. In FIG. 3 (and the other drawings discussed below), the dashed lines show the relationship between classes based on the observer pattern, and the solid lines show more direct dependencies. It will be appreciated that if the dependency links were present, but the relationships shown with the dashed lines were absent, certain example embodiments would still perform, although other modification might be desirable to ensure overall robustness.

In this regard, each type chunk may execute the following operations. In a first reader operation, the state of the chunk is set on execution, and metadata is read to determine whether there are multiple process steps to spawn or not. With respect to the latter, if there is more than one process step defined, then they may be executed in parallel.

Each of the processing steps performs its job according to, for example, the type of chunk and content data in the chunk. The processing steps send notification events based on their outcomes. Outcomes may be received by receivers, and at least one receiver stores the outcome data, e.g., so that the results are available for auditing, reviewing, data mining, and/or other purposes. In certain example embodiments, receivers that publish these notifications on collaboration or social platforms and/or send them via mail letters to interested parties, also may be registered. Thus, it will be appreciated that a receiver may act as a message consumer. This receiver may be on the same node as the sender but, in a multi-node cloud scenario, receivers generally will be distributed to different nodes. The actual receiver may persist the outcome and make it available for further processing.

A final operation in the execution chain of a chunk involves a writer, whose tasks include setting the state to "done" and writing context data of the execution such as, for example, a current sequence number, back to the repository. It will be appreciated that the context data may include any other information needed for further execution of the process, in certain example embodiments.

As indicated above, these operations may be supervised by a supervisor listener object that is configured to act on resilience tasks such as, for example, retry on failure, timeout, blacklisting of third party access requests, and/or other related tasks. The listener concept may be built on the observer pattern in certain example embodiments. For instance, certain example embodiments may involve a listener that is defined on a class that is configured to emit events about its execution state, and that can take actions based on an event type and/or event payload. This mechanism may be used in certain example embodiments to provide a supervising model for reacting to failures, etc., thereby increasing robustness and resilience.

As each chunk type is built upon this abstract flow of behavior, each one may in certain example embodiments inherit functions and/or other attributes from this groundwork and provide additional behavior that is specific for the stereotyped chunk at hand. Examples of such additional behaviors will now be provided, with reference being made to FIGS. 4-6.

Figure 4:
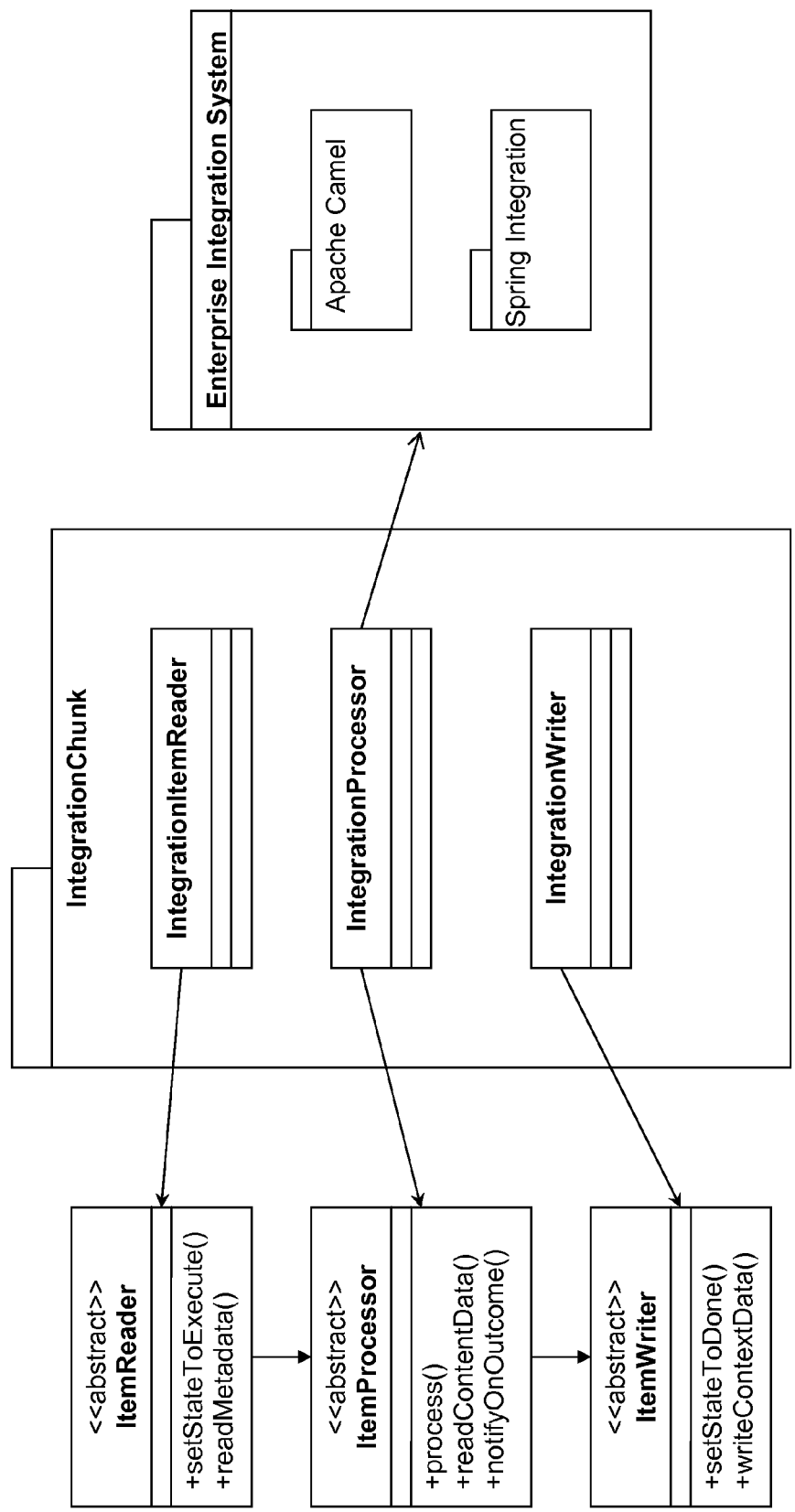
FIG. 4 shows additional functions/behaviors that may be provided for integration chunk types in accordance with certain example embodiments.

FIG. 4 shows additional functions/behaviors that may be provided for integration chunk types in accordance with certain example embodiments. Besides the generalized base classes, a dependency to a subsystem that is able to perform outbound connections (e.g., to third-party systems) may be provided. In this regard, FIG. 4 shows dependencies on Apache Camel and Spring Integration, which are open source staged event-driven architecture (SEDA) implementations that may be used to connect components based on enterprise integration patterns. It will be appreciated that other SEDA and/or non-SEDA implementations may be used to connect components to different third-party and/or internal systems in different example embodiments.

Figure 5:
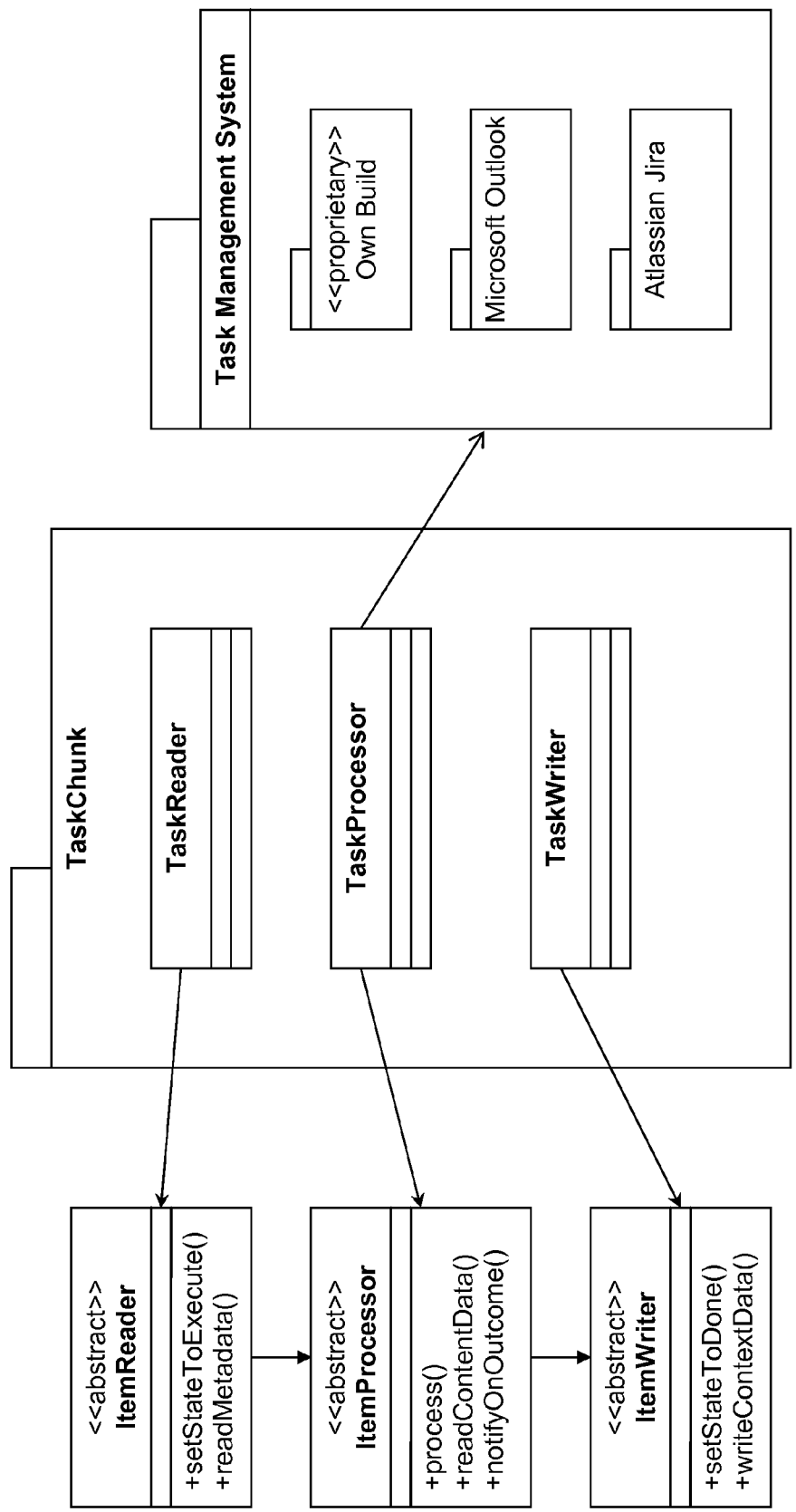
FIG. 5 shows additional functions/behaviors that may be provided for task chunk types in accordance with certain example embodiments.

FIG. 5 shows additional functions/behaviors that may be provided for task chunk types in accordance with certain example embodiments. As with the integration chunk type, the task chunk type also provides concrete implementations of the templated classes. As an addition to the inherited groundwork, a dependency to a task management system for submitting newly created tasks is provided, e.g., as can be appreciated form FIG. 5. It will be appreciated that the task management system may in certain example embodiments be any suitable system to which a task can be submitted. FIG. 5 shows a dependency to a propriety task management system, Microsoft Outlook, and Atlassia Jira, but it will be appreciated that other task management systems may be used in place of, or together with, these examples.

Figure 6:
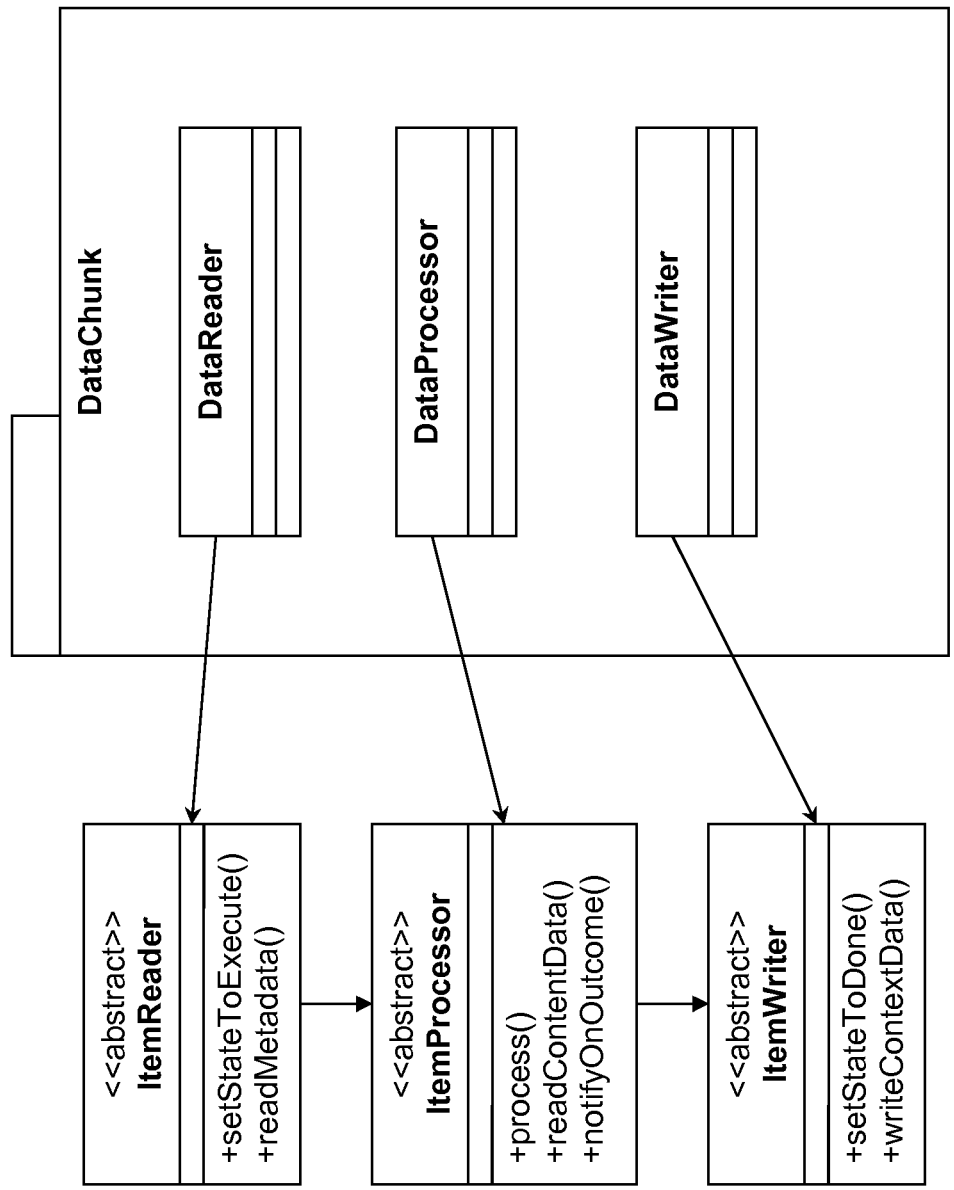
FIG. 6 shows additional functions/behaviors that may be provided for data chunk types in accordance with certain example embodiments.

FIG. 6 shows additional functions/behaviors that may be provided for data chunk types in accordance with certain example embodiments. Similar to the above, the data chunk type provides concrete implementations of the templated classes. The data chunk type does not necessarily require a dependency to a subsystem. That said, data chunks may be executed in parallel, which could make coordination more complicated. However, as an example, a flow control mechanism that sorts the received data chunks after execution may be implemented in certain example embodiments.

As will be appreciated from the description above, resilience mechanisms for these chunk types may be provided in connection with monitoring components that can react on the different steps inside of each of the chunks, e.g., according to their outcomes. For instance, one could define policies such as, for example, that integration process steps should be retried n-times and then temporarily blacklisted, that whole connection pools should be restarted after a certain number of failures, that processing should be switched to a different node after a predefined timeout period is reached, etc. Such policies may be defined as a part of the chunk types, as part of the supervisor object, etc.

Event Loop

As explained above, chunk execution depends on the respective stereotypes in certain example embodiments. Because a full process execution will include more than one chunk, a loop will be established to keep the execution ongoing until the process has finished. In addition to the chunk execution, there also may be some common tasks to fulfill that are not necessarily associated with any chunk type but nonetheless form a part of such a loop.

Figure 7:
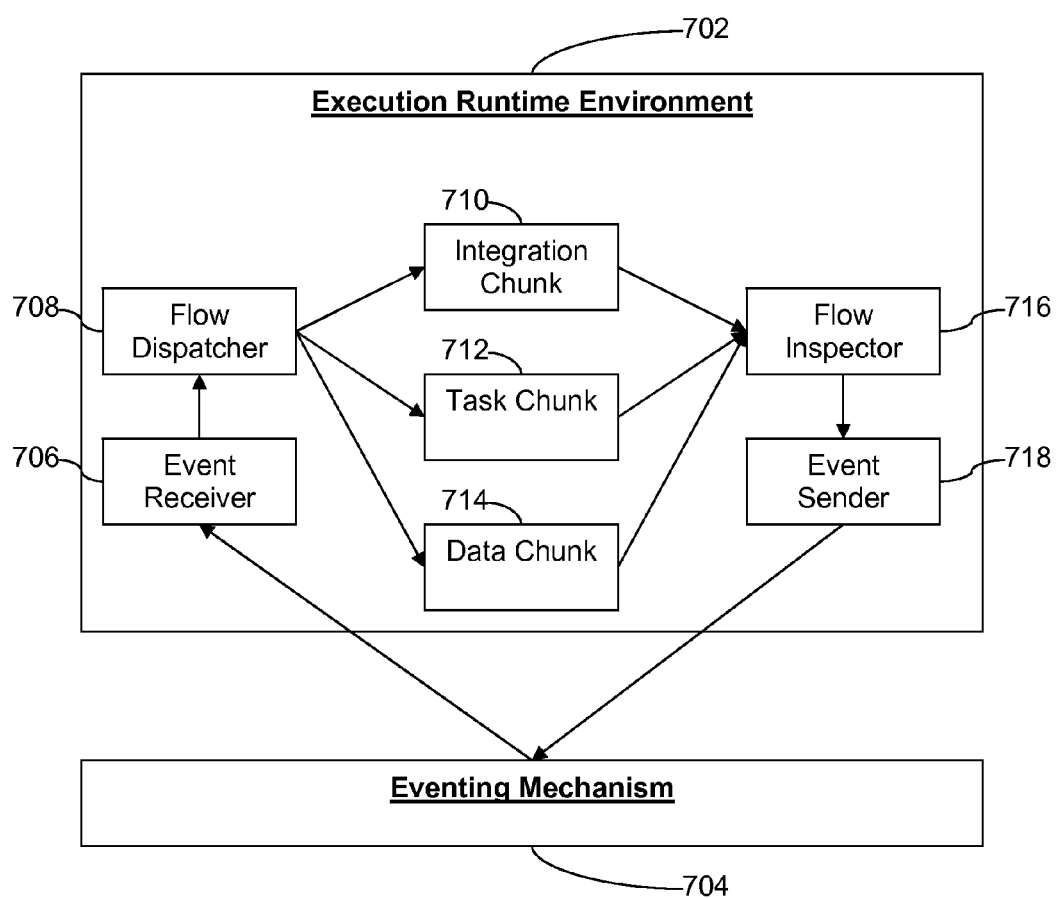
FIG. 7 is a block diagram of a generic control loop that may be used in accordance with certain example embodiments.

FIG. 7 is a block diagram of a generic control loop that may be used in accordance with certain example embodiments. FIG. 7 shows the runtime execution environment 702 receiving messages from and sending messages to the external eventing mechanism 704. More particularly, the event receiver 706 receives metadata wrapped in an event and routes it to the flow dispatcher 708. The flow dispatcher 708 examines the metadata and spawns a chunk execution of the appropriate type for incoming message. The chunk execution takes place, e.g., in connection with a spawned integration chunk 710, task chunk 712, and/or data chunk 714. After the chunk execution is finished, the flow inspector 716 determines the next step in the process, if any. If there is a next step to be performed, the flow inspector 716 delegates the metadata of this next step to the event sender 718. The event sender 718 then wraps the delegated metadata in an event and sends it back to the event mechanism 704, so that the processing loop continues. If there are no more steps, then a corresponding message could be sent back to the eventing mechanism 704.

It will be appreciated that the event sent in the last step need not necessarily be received by the same execution runtime from which it was sent. For example, the event could be routed elsewhere if there is more than one execution engine available, e.g., according to an implemented policy such as a round robin, random, or more sophisticated policy.

Figure 8:
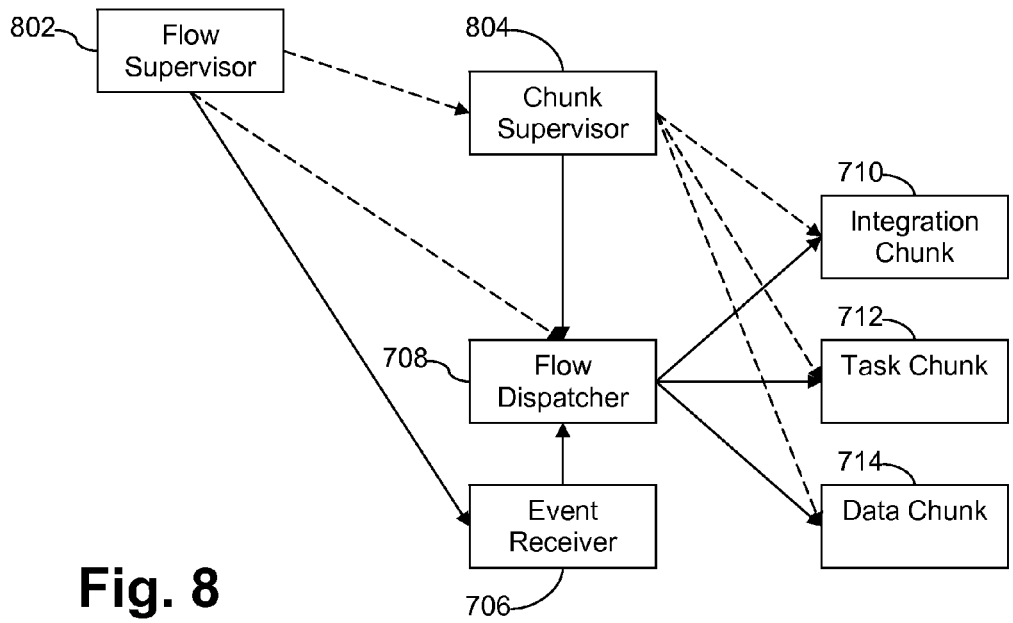
FIG. 8 is a block diagram showing how the flow event loop may be supervised, in accordance with certain example embodiments.

The flow event loop may be supervised in certain example embodiments, e.g., for resilience purposes, e.g., as shown in FIG. 8. Such supervisory techniques may also be leveraged to take certain defined reactions upon the occurrence of a condition. As shown in FIG. 8, there are two supervising components that are configured to act on failures, timeouts, and/or other execution outcomes. These components include the flow supervisor 802 and the chunk supervisor 804, although it will be appreciated that there may be additional or fewer supervisors in different example implementations.

For example, if an integration chunk times out because it encounters problems accessing a third-party system, the issue is detected by the chunk supervisor 804, and the execution could retried, started anew, etc. If the problem is not solved by re-execution, for example, the third-party system could be temporarily blacklisted, the flow dispatcher 708 may be instructed to avoid dispatching the chunk for a certain amount of time and/or avoid dispatching other chunks that make use of the third-party system etc. If the situation gets worse and the chunk supervisor 804 cannot handle it any longer (e.g., because it has tried a predetermined number of restart operations, is running low on processing resources such as memory, is holding up to many actions that require the chunk and/or third-party system, etc.), the problem may be delegated to a higher level supervisor which, in this case, is the flow supervisor 802. The flow supervisor 802 may then advise the event receiver 706 to refuse the receipt of these kinds of events, e.g., for a predetermined amount of time, until a signal is received that the third-party system is functional again (e.g., from the chunk supervisor 804 or some other authorized party), etc.

Figure 9:
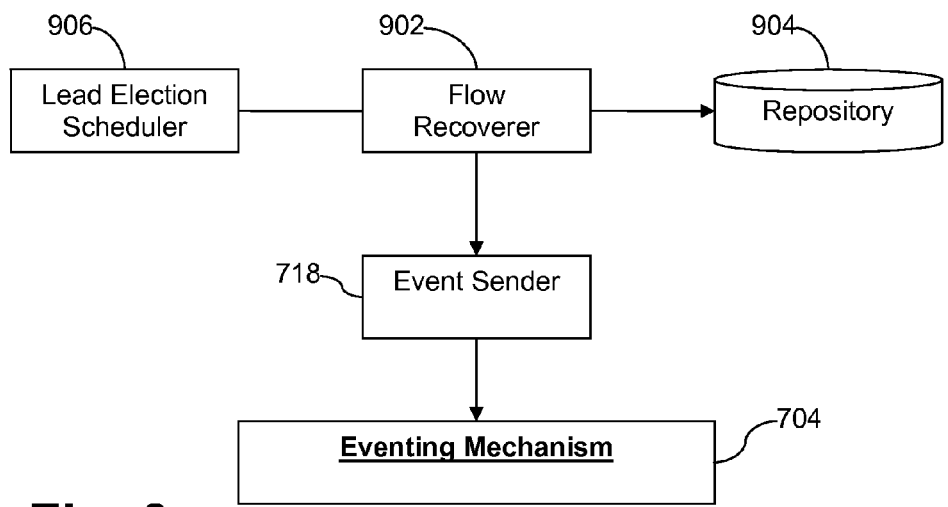
FIG. 9 is a block diagram sowing certain components that may be used in recovery operations, in accordance with certain example embodiments.

FIG. 9 is a block diagram sowing certain components that may be used in recovery operations, in accordance with certain example embodiments. These example components may make it possible to handle possible halts in the event loop. The flow recoverer 902 may, for example, start by determining what action is sending the first event, and whether there is some failure that the supervising actions are unsuccessful in addressing, e.g., to cause the event loop to continue proceeding further down the execution of the process.

The flow recoverer 902 may be started within every execution runtime, and it be scheduled to run periodically, upon manual triggering, automatically upon a certain condition being reached (e.g., processing resources reaching a predetermined level of utilization, too many errors from the highest level supervisor, failure to execute a predetermined number of process steps and/or processes, etc.). In this regard, the flow recoverer 902 may, for example, observe a repository 904 to determine if there are process steps that could be executed but are not being executed for some reason, whether there are process steps that have an "in process" state for too long, etc. If so, the flow recoverer 902 may rescheduled such steps, e.g., by resetting the relevant states and placing an event into the eventing mechanism 704 via the event sender 718.

It will be appreciated that if there is more than one execution runtime, it would be desirable to ensure that there is only one flow recoverer is working at a time. For instance, there may be a master flow recoverer, and other flow recoverers in different execution runtimes may act only if they are elected to do so. This coordination may be achieved through a form of lead election between the execution runtimes. For example, different runtimes may send messages to one another through a lead election scheduler 906, e.g., that is common to different runtime execution environments, instances, etc.; that communicates with other runtime execution environments, instances, etc., via a suitable communication channel and protocol; and/or the like.

Reactive Ground Rules

Certain example embodiments are reactive in nature. This feature is desirable in view of the evolution of and changes in how processing is done. Increasing requirements associated with cloud computing, high throughput, "continuous" uptime, big data, etc., are some of the driving forces in this direction. As is known by those skilled in the art, the Reactive Manifesto lays out certain technical requirements for being considered reactive, and these requirements include having an event-driven architecture, being scalable and resilient, and ultimately being responsive. That is, according to Reactive Manifesto, reactive applications are defined by being event driven, which leads to vertical and horizontal scalability and the potential for resilience actions being deployable in the systems. Scalability and resiliency, in turn, help provide responsiveness for clients the application is serving.

Certain example embodiments may provide techniques that are reactive, at least generally in accordance with the guidelines established in the Reactive Manifesto. For instance, as will be appreciated from the description above, certain example embodiments use communications based on sending/receiving events, which makes vertical and/or horizontal scaling possible and, thus, (in addition to being stateless) helps provide a sound platform for cloud-ready applications. Resilience is implemented in certain example embodiments through the supervisory and recovery techniques inside execution runtimes, as explained above. Finally, responsiveness is provided by providing these features, while also making use of non-blocking chunks, e.g., as facilitated in connection with timeout supervising, SEDA-based integration of the third-party applications, etc.

Extensibility

It will be appreciated that extensibility points are provided through interchangeable dependencies for task and integration chunks. Furthermore, because the integration may be built upon the above-mentioned and/or other open source frameworks, it may be possible to enable the addition of further third-party applications by simply providing a new functional route definition that describes that integration in the appropriate domain-specific language for the used framework.

Figure 10:
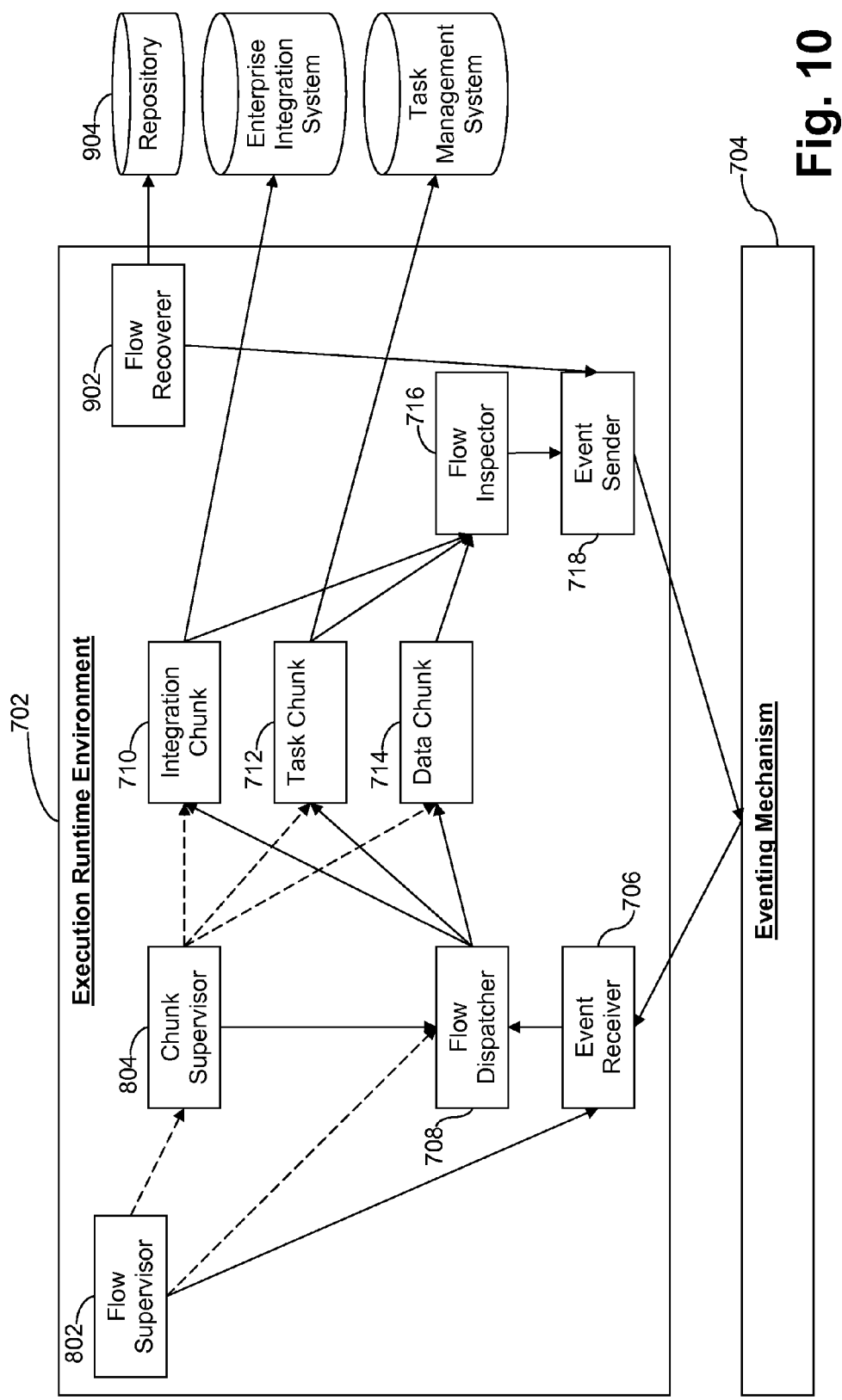
FIG. 10 is a block diagram showing the components of certain example embodiments.

FIG. 10 is a block diagram showing the components of certain example embodiments. As will be appreciated, FIG. 10 combines example aspects shown in FIGS. 3-9 and provides an overview of the components of certain example embodiments. As will be appreciated from the description above, multiple execution runtimes and/or execution runtime instances may be provided. In certain example embodiments, an instance of the FIG. 10 runtime environment may be provide for each chunk. The systems, subsystems, etc., may be backed by processing resources such as, for example, at least one processor, a memory, non-transitory computer readable storage media, etc. The eventing mechanism may be an event-driven mechanism that communicates using the publish/subscribe mechanism or the like. Example brokered messaging techniques that may be used are described in, for example, U.S. Pat. Nos. 8,453,163; 8,301,687; 8,136,122; 5,812,768; and 5,329,619, the entire contents of each of which are hereby incorporated herein by reference.

Example Implementations

The following description provides further details concerning how the system shown in FIG. 10 may operate in accordance with certain example implementations. The example embodiments thus assume the presence of an integration framework or enterprise service bus (ESB), a message and/or notification sending mechanism, a connection to a task management system, the ability to access a persistent store that acts as a repository, a means for parallel execution (e.g., on different nodes in a cloud computing or other distributed computing environment, or the like), and a means for interfacing with a user management system (e.g., for authentication, authorization, security and/or other demands), etc. Any suitable (e.g., Turing complete) implementation language may be used. It will be appreciated that although certain example implementation details are set forth below, there are of course other possible implementations.

The following is an XML representation of an example executable process definition that is used to describe certain implementation details. It will be appreciated that other representations are possible, and that this is just one simplified example.

```
...
<activities>
    <wscall>
        <name>NAME1</name>
        <activiytType>ACTIVITY_WEB_SERVICE</activityType>
        <location>...</location>
        <licenseKey>...</licenseKey>
        <serviceName>...</servicename>
        ...
    </wscall>
    <humanTask>
        <name>NAME2</name>
        <activityType>ACTIVITY_HUMAN_TASK</activityType>
        <aFormId>....</aFormId>
        ...
    </humanTask>
    <or>
```

-continued

```
        <name>OR1</name>
        <activityType>CONDITIONAL_GATEWAY_OR</activityType>
        <condition>...</condition>
        <outgoing1>SIMPLE1</outgoing1>
        <outgoing2>SIMPLE2</outgoing1>
    </or>
    <simpleActivity>
        <name>SIMPLE1</name>
        <activityType>ACTIVITY_SIMPLE<activityType>
    </simpleActivity>
    <simpleActivity>
        <name>SIMPLE2</name>
        <activityType>ACTIVITY_SIMPLE<activityType>
    </simpleActivity>
    <synchronizer>
        <name>SYNC1</name>
        <activityType>GATEWAY_SYNCHRONIZER</activityType>
        <synchronized>OR1</synchronized>
    </synchronizer>
    <email>
        <name>NAME3</name>
        <activityType>ACTIVITY_EMAIL</activityType>
            <from>...</from>
            <subject>...</subject>
            <body>...</body>
            ...
        </email>
        ...
</activities>
...
```

When this process definition is handed over to the process engine for execution, it is parsed into an internal (e.g., tabular) representation that includes process identifiers and sequence numbers, along with additional metadata. An example tabular representation is as follows:

| Process ID | Sequence | Type | Name | Content |
|---|---|---|---|---|
| P-001 | S-001 | Integration | NAME1 | ... (WS-Call properties) |
| P-001 | S-002 | Task | NAME2 | ... (Human-Task properties) |
| P-001 | S-003 | Data | OR1 | ... (all Activities until SYNC1) |
| P-001 | S-004 | Integration | NAME3 | ... (Email properties) |
| P-001 | S-005 | ... | ... | ... |

The sequencing of the process should now be apparent.

Figure 11:
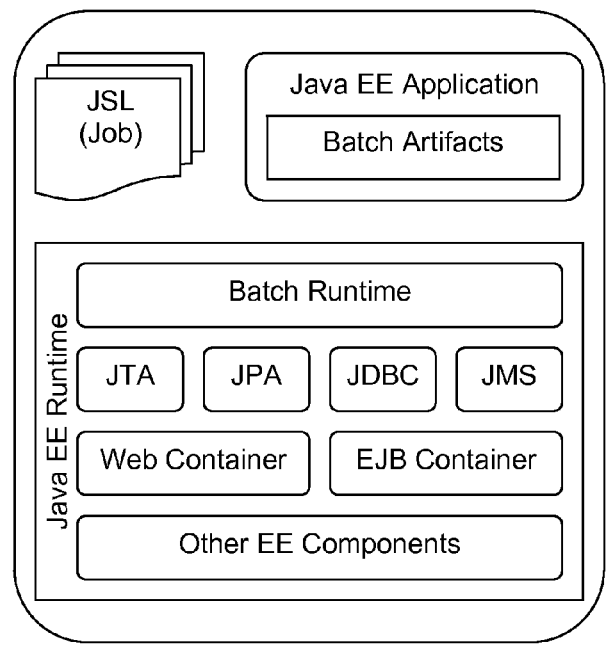
FIG. 11 is an architectural overview showing components participating in the execution and runtime of batch jobs, which may be used in certain example embodiments.

One option for implementing the chunks functionality involves using a Java batch, which is a standardization of the Spring batch framework and is available in the Java EE 7 SDK for example. FIG. 11 is an architectural overview showing components participating in the execution and runtime of batch jobs, which may be used in certain example embodiments. The FIG. 11 diagram may function in accordance with JSR 352, as will be understood by those skilled in the art. Moreover, those skilled in the art know that JSL is the Job Specification Language, JTA is the Java Transaction API, JPA is the Java Persistence API, JMS is the Java Message Service, and that an EJB Container is an Enterprise JavaBeans Container.

Figure 12:
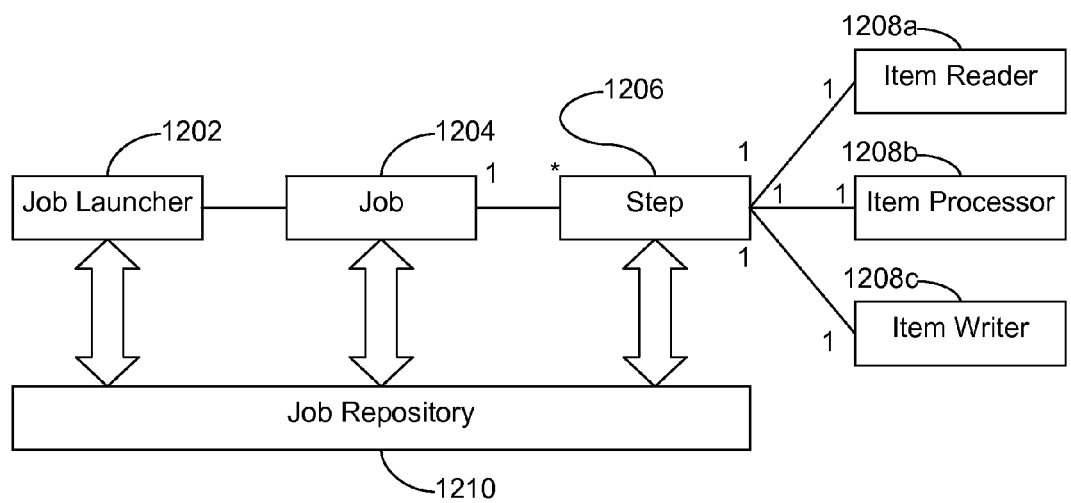
FIG. 12 is an architectural overview of the batch artifacts and runtime model that may be used in connection with certain example embodiments.

Although the EE runtime container is shown in FIG. 11, it will be appreciated that other containers and/or frameworks may be used. For instance, it may be desirable to use the Spring Batch framework which, although not standardized, does not place runtime restrictions on the implementer. FIG. 12 is an architectural overview of the batch artifacts and runtime model that may be used in connection with certain example embodiments. As can be seen from FIG. 12, the Spring batch stereotypes match the above described chunk functionality and could be used for a possible implementation. As shown in FIG. 12, a job launcher 1202 launches jobs 1204, and each job 1204 may include multiple steps 1206. The steps may be processed by the item reader, processor, and writer 1208a-1208c. The job launcher 1202, jobs 1204, and multiple steps 1206 may communicate with a job repository 1210.

Figure 13:
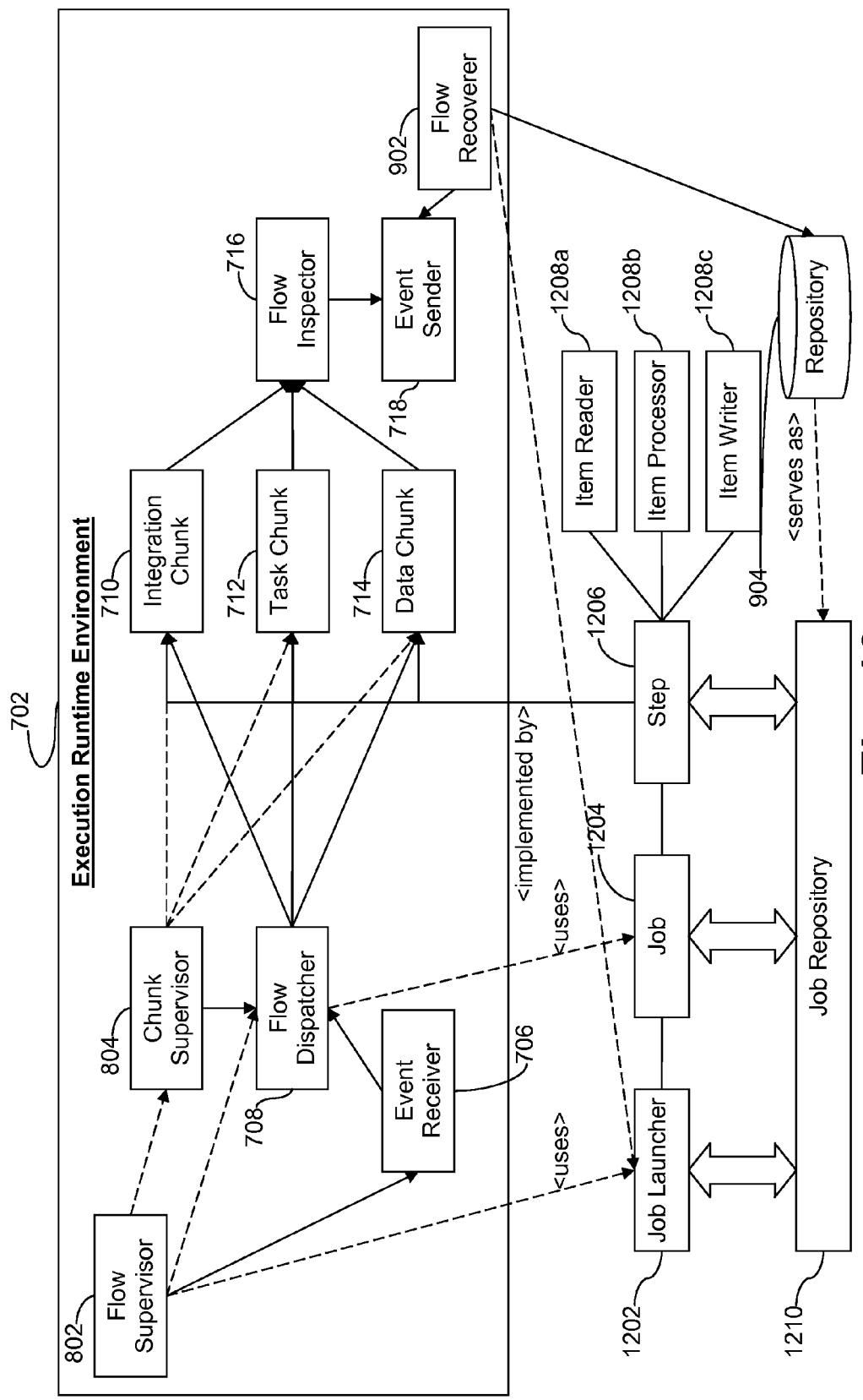
FIG. 13 in essence blends together elements from FIG. 10, with the FIG. 12 example implementation, in accordance with certain example embodiments.

FIG. 13 in essence blends together elements from FIG. 10, with the FIG. 12 example implementation, in accordance with certain example embodiments. For example, in terms of batching mapping, it will be appreciated that the item reader, processor, and writer 1208a-1208c may provide the basic, abstract functionality for processing the different chunks 710-714. It also will be appreciated that the job repository 1210 may serve as a process definition store. The framework and operation of the job launcher 1202, jobs 1204, and steps 1206 may be used by the flow dispatcher 708, the flow recoverer 902, and the supervisors 802-804, e.g., for doing their respective activities.

Another approach would be to build up the example functionality described herein using an actor-based model. An actor-based model may, for example, involve a message passing mechanism, e.g., using a shared nothing approach. In one such example embodiment, the only information different nodes exchange is messages. In certain example embodiments, assuming that any node could be elected as an actor, that node may send out messages to other nodes, e.g., including the related chunks, as well as receives data chunks, thereby acting as a receiver as well.

The implementation of the eventing mechanism may be based on, for example, the approach taken for the chunk implementation. If the chunks are based on any of the batch frameworks, one choice for distributing events may involve an external message broker. For example, if the standard version of the batch in Java EE 7 is used, the standard messaging platform in Java EE 7 SDK, namely, a JMS certified broker, may be used. One open source product that provides these JMS capabilities is Apache ActiveMQ.

In the Spring batch framework is used, an AMQP-based message broker that provides for a variety of different messaging patterns may be used. An open source product that may be used in this regard is RabbitMQ.

If the actor model is selected as an implementation base, an additional message broker need not be used. Instead, actors could send their message remotely and, in other words, remote managed calls could be used as the eventing mechanism in at least some of these scenarios.

As indicated above, a wide variety of options are available for use as the runtime environment. For example, the standard batch framework from Java EE7 SDK may be used with a certified Java EE 7 container, although the same or different containers may be sued with different batch or other frameworks. Moreover, the Spring and Akka implementations may run a variety on a wide variety of JVM containers. In fact, the Spring and Akka implementations do not always need a container service, so that they even could run as "plain" Java applications, thereby potentially reducing overall footprint, administration, and maintenance efforts.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of executing a business process in a distributed computing environment that includes a plurality of computer nodes that communicate via an electronic data communications network, each of the plurality of computer nodes including hardware processing resources, the method comprising:
    generating, based on an existing computer modeled representation of the business process and by using at least one processor, a plurality of executable components that are each independently executable, by different processing resources, from one another, where the plurality of generated executable components are separate from the existing computer modeled representation of the business process;
    assigning, to each one of the plurality of generated executable components, a process identifier that corresponds to the computer modeled representation of the business process, and a sequence identifier that is based on where the corresponding executable component is used within the business process, where at least some of the executable components are assigned different sequence identifiers and some are assigned the same sequence identifier;
    classifying each of the plurality of generated executable components into at least one of a plurality of different executable component types, the different executable component types including an integration flow type, a task flow type, and a data flow type, the integration flow type representing activities to be performed in connection with external computer systems, the task flow type representing human-interactive activities, and the data flow type representing activities to be performed on data relevant to the business process, where each one of the executable components is generated with additional programmatic functionality that is specific to the corresponding classified executable component type; and
    transmitting, via the electronic data communications network, the executable components to different ones of the plurality of computer nodes in the distributed computing environment such that the executable components are performed, using the hardware processing resources of a corresponding computer node, in an order that is based on the sequence identifier of the corresponding executable component, except that executable components with the same sequence identifiers are performed in parallel on different ones of the computer nodes, in executing the business process.

2. The method of claim 1, further comprising:
    receiving notifications over an event bus and at a supervisor node in the distributed computing environment, the notifications being usable to signal completed performance of the executable processes by the nodes to which they are deployed; and storing to a non-transitory computer readable storage medium at least some outcome-related information based on the received events.

3. The method of claim 2, wherein the supervisor node is configured to receive and respond to notifications indicating executable component performance failures, timeouts, and attempted interfaces with blacklisted third-parties.

4. The method of claim 2, wherein the supervisor node is configured to receive and respond to fault messages by sending a notification to a higher level supervisor node once the number of fault messages exceeds a predetermined threshold.

5. The method of claim 1, wherein at least some of the nodes are configured to perform executable components for different processes in parallel, each of these executable components being above the thread level.

6. The method of claim 1, wherein at least some of the human-interactive activities are performed in connection with an external task management system.

7. The method of claim 1, wherein the computer modeled representation of the business process is in XML.

8. The method of claim 1, wherein the computer modeled representation of the business process is in BPEL.

9. A method of executing a process in a distributed computing environment, the method comprising:

generating, based on a representation of the process and by using at least one processor, a plurality of executable components that are each independently executable, by different processing resources, from one another, where the plurality of generated executable components are separate from the representation of the process, each of the plurality of executable components having assigned thereto a process identifier and a sequence identifier;

transmitting the executable components to computer nodes in the distributed computing environment for execution thereon, each said executable component being sent as an associated event over an event bus, where the executable components are executable in an order that is based on the sequence identifier of the corresponding executable component, except that executable components with the same sequence identifiers are performed in parallel on different ones of the computer nodes, in executing the business process; and controlling each of the computer nodes that receives an event to at least:

determine, based on the received event and the metadata of the associated executable component, an executable component type of the respective executable component, the executable component type being one of an integration data flow type, a task data flow type, and a data flow type, the integration flow type representing activities to be performed in connection with external computer systems, the task flow type representing human-interactive activities, and the data flow type representing activities to be performed on data relevant to the process, where each one of the plurality of executable components is generated with additional programmatic functionality that is specific to the corresponding executable component type;

spawn an execution environment tailored to the executable component type of the executable component that was sent as the received event;

execute the executable component associated with the received event using the spawned execution environment and processing resources provided to the respective node, the processing resources including at least one processor;

determine whether there is a next step in the process to be executed; and in response to a determination that there is a next step in the process to be executed, sending a new event corresponding to the next step to the event bus, along with associated metadata.

10. The method of claim 9, further comprising providing at least first and second supervisory components that each is configured to act on failure and/or timeout outcomes during execution of the executable components.

11. The method of claim 10, further comprising referring unresolved problems from the first supervisory component to the second supervisory component.

12. The method of claim 10, further comprising:

determining whether there are any next steps that could be performed that are not currently being performed, and whether there are any process steps that have been processing for at least a predetermined time period; and in response to a determination that there are any next steps that could be performed that are not currently being performed, and/or a determination that there are any process steps that have been processing for at least a predetermined time period, rescheduling for execution such steps by sending a corresponding event to the event bus.

13. The method of claim 9, further comprising:

determining whether there are any next steps that could be performed that are not currently being performed, and whether there are any process steps that have been processing for at least a predetermined time period; and in response to a determination that there are any next steps that could be performed that are not currently being performed, and/or a determination that there are any process steps that have been processing for at least a predetermined time period, rescheduling for execution such steps by sending a corresponding event to the event bus.

14. The method of claim 9, wherein at least some of the nodes are configured to perform executable components for different processes in parallel, each of these executable components being above the thread level.

15. The method of claim 9, wherein the representation of the process is in XML and/or BPEL.

16. A non-transitory computer readable storage medium tangibly storing a program that, when executed, performs instructions that carry out the method of claim 1.

17. A non-transitory computer readable storage medium tangibly storing a program that, when executed, performs instructions that carry out the method of claim 9.

18. A distributed computing system in which a process is to be executed, comprising:

a plurality of computer nodes, each said node including processing resources comprising at least one processor and a memory; and an event bus; wherein:

a first node is designated as a supervisor node, the supervisor node being configured to at least:

generate, using processing resources, a plurality of executable components of the process that are each independently executable, by different processing resources, from one another, where the plurality of generated executable components are separate from the process or an existing computer modeled representation of the process, the plurality of executable components each having assigned thereto process and sequence identifiers; and transmit the executable components to other computer nodes in the distributed computing environment for execution thereon, each said executable component being sent as an associated event over the event bus, where the executable components are executable in an order that is based on the sequence identifier of the corresponding executable component, except that executable components with the same sequence identifiers are performed in parallel on different ones of the computer nodes, in executing the business process; and each node that receives an event having an associated executable component is controlled to at least:

determine, based on the received event and the metadata of the associated executable component, an executable component type of the respective executable component, the executable component type being one of an integration, task, and data flow type, the integration flow type representing activities to be performed in connection with external computer systems, the task flow type representing human-interactive activities, and the data flow type representing activities to be performed on data relevant to the process, where each one of the plurality of executable components is generated with additional programmatic functionality that is specific to the corresponding executable component type;

spawn thereon an execution environment tailored to the executable component type of the executable component associated with the received event;

execute the executable component associated with the received event using the spawned execution environment and the processing resources provided to the respective node;

determine whether there is a next step in the process to be executed; and in response to a determination that there is a next step in the process to be executed, sending a new event corresponding to the next step to the event bus, along with associated metadata.

19. The system of claim 18, further comprising at least first and second supervisory modules, each being configured to act on failure and/or timeout outcomes during execution of the executable components.

20. The system of claim 19, wherein the first supervisory module is configured to refer unresolved problems to the second supervisory module.

21. The method of claim 18, wherein each node that receives an event having an associated executable component is further controlled to at least:

determine whether there are any next steps that could be performed that are not currently being performed, and whether there are any process steps that have been processing for at least a predetermined time period; and in response to a determination that there are any next steps that could be performed that are not currently being performed, and/or a determination that there are any process steps that have been processing for at least a predetermined time period, reschedule for execution such steps by sending a corresponding event to the event bus.

22. The system of claim 18, wherein at least some of the nodes are configured to perform executable components for different processes in parallel, each of these executable components being above the thread level.

23. The system of claim 18, wherein the representation of the process is in XML and/or BPEL.

* * * * *